US009697494B2

(12) United States Patent
Carter et al.

(10) Patent No.: US 9,697,494 B2
(45) Date of Patent: Jul. 4, 2017

(54) ENHANCING USER INTERACTION BY DISPLAYING IMAGES FROM A NETWORK

(75) Inventors: Bernadette A. Carter, Cary, NC (US); Belinda Y. Chang, Cary, NC (US); Fuyi Li, Sudbury, MA (US); Pamela A. Nesbitt, Tampa, FL (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 2760 days.

(21) Appl. No.: 12/186,746

(22) Filed: Aug. 6, 2008

(65) Prior Publication Data

US 2010/0037141 A1 Feb. 11, 2010

(51) Int. Cl.
*G06F 3/03* (2006.01)
*G06Q 10/10* (2012.01)

(52) U.S. Cl.
CPC .................................. *G06Q 10/10* (2013.01)

(58) Field of Classification Search
CPC ........................................................ G06F 3/00
USPC ................................. 715/733, 747, 781, 756
See application file for complete search history.

(56) References Cited

U.S. PATENT DOCUMENTS

| 5,590,271 | A  | * | 12/1996 | Klinker .......................... 715/763 |
|-----------|-----|---|---------|--------------------------------------|
| 7,130,807 | B1 | * | 10/2006 | Mikurak ....................... 705/7.25 |
| 7,567,304 | B2 | * | 7/2009  | Kim et al. .................... 348/725 |
| 7,603,421 | B1 | * | 10/2009 | Roche et al. .................. 709/206 |
| 7,610,352 | B2 | * | 10/2009 | AlHusseini et al. .......... 709/217 |
| 8,307,273 | B2 | * | 11/2012 | Pea et al. ..................... 715/201 |
| 8,375,421 | B1 | * | 2/2013  | Shigapov et al. ................ 726/4 |
| 2008/0225110 | A1 | * | 9/2008  | Lin et al. .................... 348/14.03 |
| 2009/0055285 | A1 | * | 2/2009  | Law et al. ..................... 705/26 |
| 2009/0094086 | A1 | * | 4/2009  | Bruno et al. ...................... 705/9 |
| 2009/0249244 | A1 | * | 10/2009 | Robinson et al. ............. 715/781 |
| 2009/0300139 | A1 | * | 12/2009 | Shoemaker et al. .......... 709/217 |
| 2011/0191695 | A1 | * | 8/2011  | Dinka et al. .................. 715/753 |
| 2013/0088484 | A1 | * | 4/2013  | Marra et al. .................. 345/418 |

* cited by examiner

*Primary Examiner* — Amy Ng
*Assistant Examiner* — Meseker Takele
(74) *Attorney, Agent, or Firm* — DeLizio Law, PLLC

(57) ABSTRACT

In a user-interactive method and system, a display application for enhancing user interaction over a network is provided. The method includes receiving preference information from a first user, the preference information indicating at least one type of image the first user wishes to view. In response to a network interaction being established between at least the first user and a second user, the method further includes retrieving a plurality of images associated with the second user based on the preference information. The method further includes displaying the plurality of images based on the preference information.

22 Claims, 3 Drawing Sheets

ENHANCING USER INTERACTION BY DISPLAYING IMAGES FROM A NETWORK

BACKGROUND OF THE INVENTION

Many individuals communicate virtually over networks for business and for personal interaction with other individuals using tools such as chat programs, e-meetings, etc., to interact and collaborate. A problem with virtual communication is that it can be difficult for users to build rapport with each other when not interacting face-to-face. During face-to-face interaction, individuals have various modes of communication (e.g., visual, auditory, kinesthetic, etc.), which help individuals to get to know and understand each other personally. While some these modes of communication are indeed possible in virtual communication, user interaction over networks still tends to lack a "human feel," especially when many users have never met or interacted in person. In a business context, many employees collaborate remotely, and when they communicate with one another they are typically focused on the task at hand. Consequently users build only limited rapport despite being in constant communication via chat programs, e-meeting software, meeting calls, etc. This is especially true with individuals who telecommute and who have very limited face-to-face interaction with other employees.

One conventional solution to building rapport in a chat system provides an image of the remote user next to the text box. Another conventional solution to building rapport in an e-meeting system provides an image of the meeting attendees. However, a problem with these conventional solutions is that the images are limited in that they only provide what a given user or users look like.

BRIEF SUMMARY OF THE INVENTION

In a user-interactive method and system, a display application for enhancing user interaction by displaying images from a network is provided. The method includes receiving preference information from a first user, the preference information indicating at least one type of image the first user wishes to view. In response to a network interaction being established between at least the first user and a second user, the method further includes retrieving a plurality of images associated with the second user based on the preference information. The method further includes displaying the plurality of images based on the preference information.

DETAILED DESCRIPTION OF THE INVENTION

The present invention relates to a method and system for enhancing user interaction by displaying images from a network. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The exemplary embodiment of the present invention enhances user interaction over a network. Generally, while a first user is connected to a second user over a network via a social network service or other service such as an instant messaging service, a display application of the first user displays on the screen of the first user a series of images associated with the second user. Similarly, a display application of the second user may display on the screen of the second user, a series of images associated with the first user. These images may be photos of each respective user's friends, family, hobbies, common interests, etc. Viewing such images enables users to see various aspects each other's lives, which helps to build rapport and enhance the interaction between the users. As described in more detail below, the method allows each user to provide preference information indicating what types of images the user wishes to view. In response to a given network interaction being established between the users, the display application of a given user retrieves images associated with the other user based on the preference information. The display application then displays images sequentially on the screen of the given user based on the preference information.

Although the present invention disclosed herein is described in the context of images associated with a given user, the present invention may apply to other forms of information associated with a given user such as profile information, and still remain within the spirit and scope of the present invention.

Figure 1:
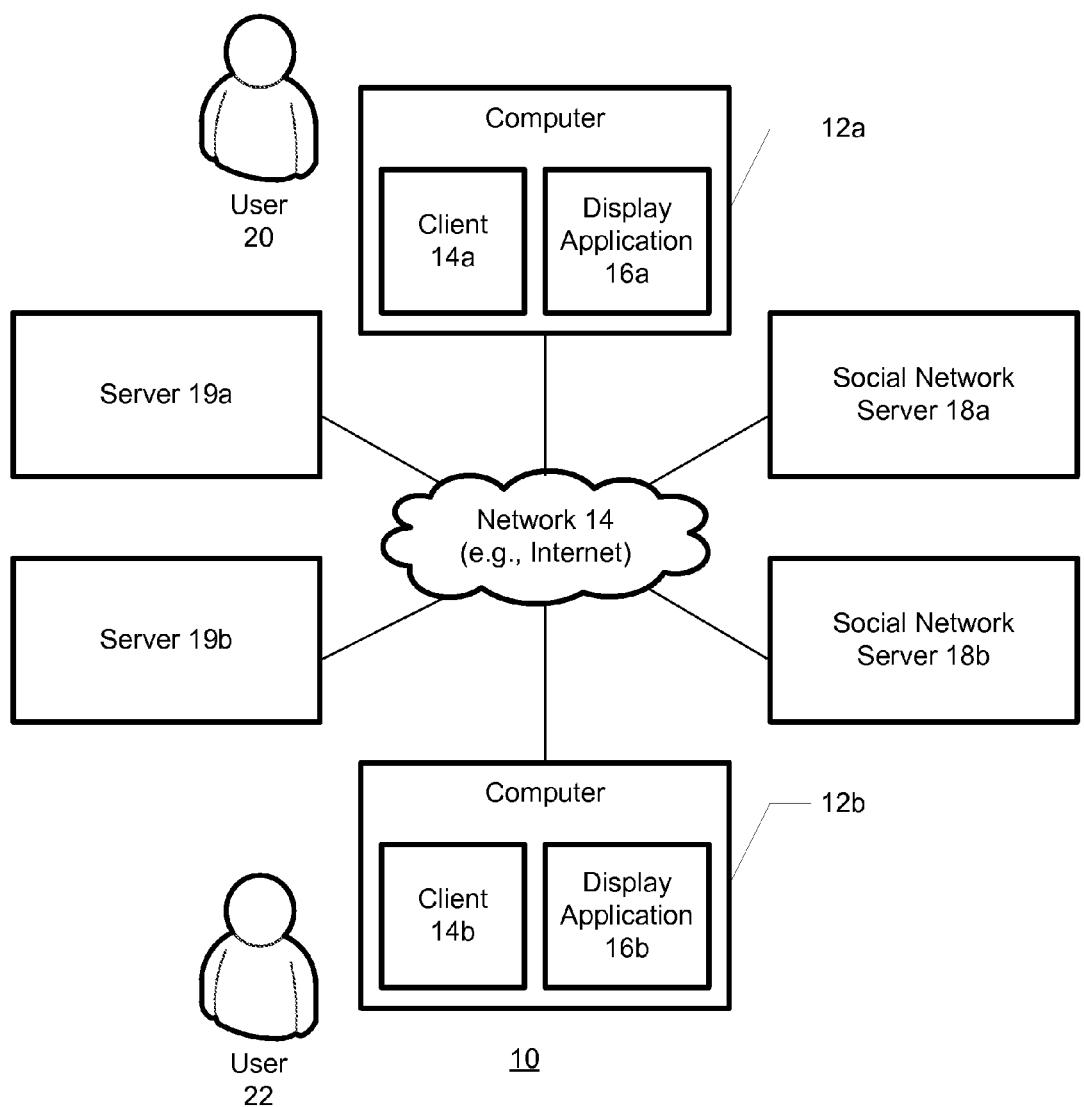
FIG. 1 is a logical block diagram illustrating an exemplary network system environment in which one embodiment of the present invention may be implemented for enhancing user interaction over a network.

FIG. 1 is a logical block diagram illustrating an exemplary network system environment in which one embodiment of the present invention may be implemented for enhancing user interaction over a network. A network system environment 10 is shown in which two or more computers 12*a* and 12*b* communicate over a network 14. The network 14 may be a public network, such as the Internet, or a private network, such as an intranet, LAN, or WLAN, or a combination thereof. At least a portion of the computers 12*a* and 12*b* may execute respective clients, such as clients 14*a* and 14*b*, and execute respective display applications 16*a* and 16*b*. In particular embodiments, the display applications 16*a* and 16*b* may be separate from respective clients 14*a* and 14*b* or may be extensions of respective clients 14*a* and 14*b*. The display applications 16*a* and 16*b* may be stored in respective memories of computers 12*a* and 12*b* or on any other suitable storage location or computer-readable medium. The display applications 16*a* and 16*b* provide instructions that when executed by processors of computers 12*a* and 12*b*, perform the functions described herein.

For ease of illustration, each of the computers 12*a* and 12*b* show only one client 14*a* and 14*b*. Each of the clients 14*a* and 14*b* shown may represent one or more clients of various types. For example, each of the clients 14*a* and 14*b* may represent one or more social network clients that operate with one or more social network servers 18*a* and 18*b* to provide social network services. Similarly, each of the clients 14*a* and 14*b* may also represent one or more clients that operate with one or more servers 19*a* and 19*b* of any particular type (e.g., an instant messaging server) to provide instant messaging services.

Each of the social network servers 18a and 18b may represent a server that host social network services provided by a given social network provider (e.g., MySpace, Facebook, etc.). As is well-known, a social network service enables users such as users 20 and 22 to interact with each other and with other users, typically in a social network website. Such interaction may include messaging, email, video and voice chat, file sharing, blogging, discussion groups, etc. Each of the users 20 and 22 may be a member of the one or more of such social network services. Similarly, each of the servers 19a and 19b represents a server that provides other types of network services (e.g., Yahoo Instant Messenger, etc.).

For ease of illustration, the following embodiments are primarily described from the perspective of user 20 viewing images associated with user 22. However, these embodiments may also apply to the perspective of user 22 viewing images associated with user 20.

Figure 2:
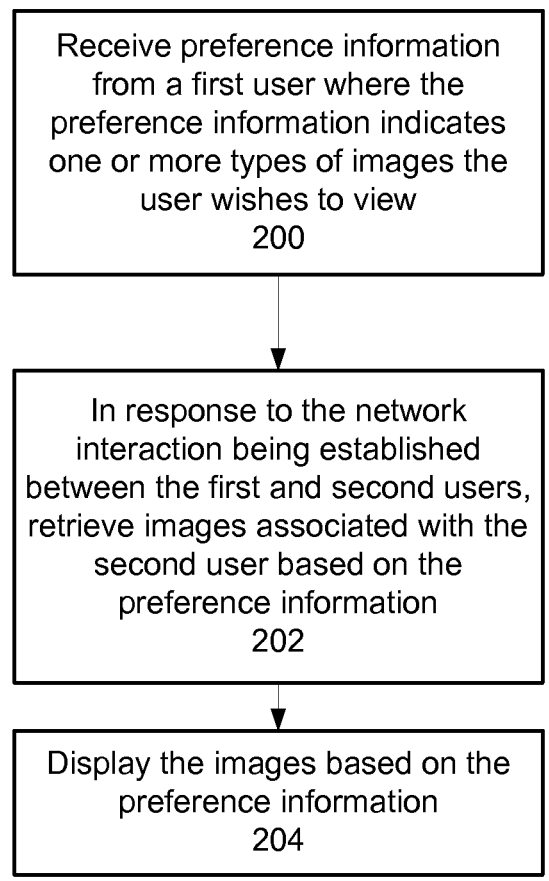
FIG. 2 is a diagram illustrating a process for enhancing user interaction over a network according to an exemplary embodiment.

FIG. 2 is a diagram illustrating a process for enhancing user interaction by displaying images from a network according to an exemplary embodiment. The process may begin by the display application 16a receiving preference information from a first user 20, where the preference information indicates one or more types of images the user 20 wishes to view (block 200). In one embodiment, the preference information may include one or more image popularity preferences. For example, user 20 may want to view images associated with other users that have a certain popularity rating in a given social network website. In one embodiment, the preference information may include one or more user relationship preferences. For example, user 20 may want to view images showing friends or family of other users. In one embodiment, the preference information may include one or more interest preferences. For example, the user 20 may want to view images associated with other users that are related to common interests (e.g., lost civilizations, chinchillas, bocce ball, etc.) or similar interests (e.g., interests related to health, nature, art, etc.). In one embodiment, the interest preferences may include common communities (e.g., Commonwealth Club, Mensa, Alliance Francaise, etc.).

In one embodiment, the preference information may include one or more image attribute preferences. For example, the user 20 may want to view more recent images associated with other users (e.g., images that have been taken within the last year). In one embodiment, the preference information may include one or more current activity preferences. For example, the display application 16a may display information based on what is currently happening in a given meeting between users, or based on where the user's 20 mouse is hovering over or personal settings set up by user 20. In a specific example, user 20 may want to view particular images depending on: whether the mouse of user 20 is hovering over an image of specific person; who is talking at a given moment in an e-meeting; etc.

In one embodiment, the clients 14a and 14b may establish a network interaction between users 20 and 22 via any given server (e.g., social network servers 18a or 18b, servers 19a or 19b, etc.) through which a connection service or network interaction service is provided. For example, a social network service, instant messaging service, or any other service may provide the network interaction. In particular embodiments, a network interaction may be defined as a synchronous or asynchronous network connection between two or more users.

In response to the network interaction being established between the first and second users 20 and 22, the display application 16a retrieves images associated with the second user 22 based on the preference information (block 202). For ease of illustration, the network interaction is described in the context of two users. However, the network interaction may also involve three or more users. In a specific embodiment, the display application 16a may determine identification information associated with user 22 (e.g., user name) and search a network, such as the Internet, for images based on the identification information and the preference information. In one embodiment, to search for the images, the display application 16a determines one or more sources for images based on the identification information. Sources may include, for example, one or more local and remote memory locations associated with one or more social network servers 18a and 18b or associated with any other server 19a and 19b to which user 22 is associated. User 22 may be associated, for example, with social network server 18a, because user 22 is a registered user or member of the social network service provider that is providing the social network website (e.g., Facebook, LinkedIn, etc.) or photo sharing website (e.g., Flickr, Beehive, Google Photos, etc.).

In one embodiment, the display application 16a determines permission information for accessing each image in order to determine whether the image is accessible. In one embodiment, this determination may be made, for example, by requesting the permission information from the service provider. In one embodiment, the permission information is based on settings that user 22 configures. For example, user 22 can control which images other users (e.g., user 20) may view via privacy control or permission settings provided by the hosting social network website. For example, for a given image, the user 22 can specify that only "friends" may view the image. As such, in particular embodiments, access to particular images may be available at a particular source, because users 20 and 22 may be "friends" on the corresponding social network website. In one embodiment, for each image that the display application 16a has permission to access, the display application 16a matches the preference information with one or more tags associated with the image. The display application 16a may look for key words such "sister," "pet," etc., or key information such as a date stamp.

In one embodiment, the display application 16a may search for social network data associated with the user to determine social network connections between the users as well as common interests. In particular embodiments, social network connections may be defined as associations between users (e.g., friends, family, etc.). The display application 16a may then use the social network data to construct a weighted search algorithm that determines which images and how many images to retrieve from the social networking or photo sharing website. In one embodiment, the weighted search algorithm filters images for retrieval using a set of rules based on preference information. For example, the filtering may be based on one or more of the following: number of mutual acquaintances, degree of interest similarity, tags of images that match interests listed in the user's profile, popularity of an image based upon the viewing of other individuals in the social network website. In one embodiment, the weighted search algorithm can restrict images. For example, a given user may not want to view particular types of images (e.g., work related images, non-work related images, etc.). After retrieving the images, the display application 16a stores the images in any suitable memory location.

Referring still to FIG. 2, the display application 16a displays the images based on the preference information (block 204). In one embodiment, the display application 16a displays the images in a convenient viewing location on the user's screen.

Figure 3:
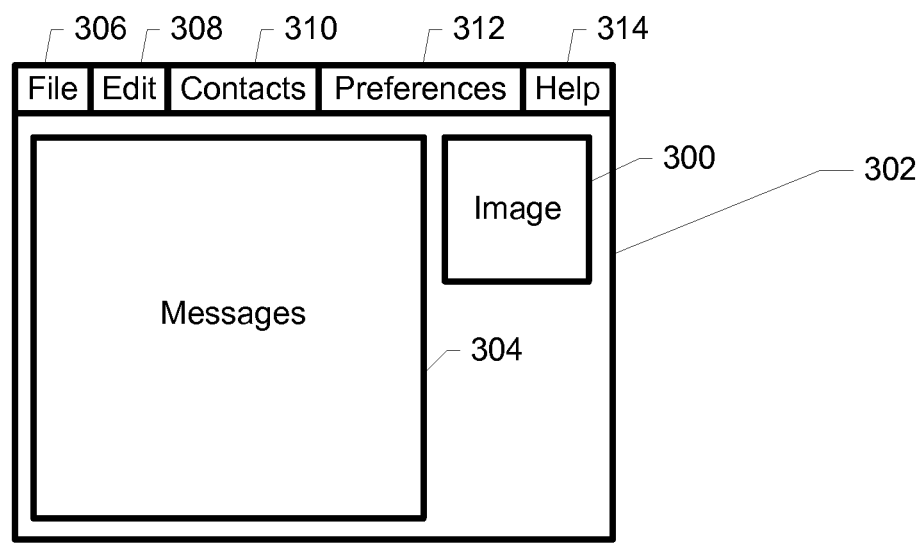
FIG. 3 is a diagram illustrating one embodiment for displaying the images.

FIG. 3 is a diagram illustrating one embodiment for displaying the images. As FIG. 3 shows, an image window 300 is displayed in a chat window 302 according to one embodiment. The chat window 302 also includes a message window 304 for displaying chat messages, and a tool bar that may include a file tab 306, an edit tab 308, a contacts tab 310, a preferences tab 312, and a help tab 314 for corresponding pull-down menus. The preferences tab 312 provides a pull-down menu that enables a given user to provide or select the preference information for the images. Although this particular embodiment is described in the context of a chat window, the embodiments of the present invention may apply to other types of windows utilized in social or profession network services (e.g., Instant Messenger communications, non-Instant Messenger communications such as Skype, Voice over Internet Protocol (VoIP), email, etc.), and still remain within the spirit and scope of the present invention.

In one embodiment, the display application 16a displays the retrieved images sequentially in the image window 300 and cycles through the images in real-time while users 20 and 22 are connected. In other words, the image window 300 is a dynamic viewer showing images that continually change. Accordingly, as users 20 and 22 view each other's messages in their respective chat windows 304, users 20 and 22 also view each other's images in their respective image windows 300. Viewing images of each other's friends, family, hobbies, common interests, etc., enables users to see other aspects each other's lives, which helps to build rapport and enhances the interaction between users.

In one embodiment, the display application 16a displays the retrieved images sequentially by displaying the images one at a time. However, the display application 16a is not limited to the number of images that it can display simultaneously. For example, the display application 16a may display two or more images simultaneously and then display another two or more images simultaneously, etc. Furthermore, in a scenario where more than two users are connect over the network (e.g., in an e-meeting), the display application 16a may simultaneously display multiples images associated with the other users in the meeting.

In one embodiment, the display application 16a includes a display algorithm that orders the images to be displayed based on a priority scheme, which may include a set of rules to be applied to the retrieved images. For example, in one embodiment, the display algorithm of the display application 16a prioritizes the retrieved plurality of images based on preference information. For example, in one embodiment, the display algorithm may give a high priority to images having one or more particular attributes (e.g., sports related images, images of family, etc.). In one embodiment, the display application 16a may display images having a higher priority before displaying images having a lower priority. Alternatively, the display application 16a may display images randomly yet display the images having a higher priority more frequently than images having a lower priority. In one embodiment, the display algorithm may use rules to give some preference information a higher (or lower) weight than others. For example, the display algorithm may give some preference information (e.g., interest preferences) a higher weight than others. The display algorithm may give particular images attributes (e.g., images showing people, mutual acquaintances, etc.) a higher weight than others.

According to the method and system disclosed herein, the present invention provides numerous benefits. For example, embodiments of the present invention enable users to conveniently receive and view a stream of personal images that may be viewed during online interaction. Embodiments of the present invention provide a filtering mechanism for retrieving images. Embodiments of the present invention also provide users a convenient way to see what they have in common, their mutual friends, and noteworthy events.

In particular embodiments, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for enhancing user interaction over a network, the method comprising:
 receiving preference information from a first user, the preference information indicating at least one type of image the first user wishes to view; and
 in response to a network interaction being established between at least the first user and a second user, wherein the network interaction comprises an electronic meeting having a number of users that includes the first user and the second user, retrieving a plurality of images associated with the second user based on the preference information, wherein the preference information comprises a user of the number of users that is talking at a given time in the electronic meeting; and displaying the plurality of images based on the preference information.

2. The method of claim 1 wherein the preference information comprises at least one of an image popularity preference, a user relationship preference, an interest preference, an activity preference, and an image attribute preference.

3. The method of claim 1, wherein the retrieving comprises:
determining identification information associated with the second user; and searching the network for the plurality of images based on the identification information and the preference information, wherein the searching comprises:
determining one or more sources for the plurality of images based on the identification information;
determining permission information for accessing each image of the plurality of images;
determining the accessible images based on the permission information; and
matching the preference information with at least one tag associated with each accessible image.

4. The method of claim 1 further comprising prioritizing the retrieved plurality of images based on preference information, wherein images having a higher priority are displayed more frequently than images having a lower priority.

5. The method of claim 1, wherein the preference information comprises a location of a pointer of a mouse of the first user during the electronic meeting.

6. The method of claim 1, wherein the retrieving of the plurality of images comprises retrieving the plurality of images from multiple sources coupled to the network, wherein at least one source of the multiple sources comprises a social network server, wherein the retrieving comprises:
determining identification information associated with the second user; and
searching the network for the plurality of images based on the identification information and the preference information, wherein the searching comprises:
determining one or more sources from the multiple sources for the plurality of images based on the identification information;
determining permission information for accessing each image of the plurality of images;
determining the accessible images based on the permission information; and
matching the preference information with at least one tag associated with each accessible image.

7. The method of claim 1, wherein the electronic meeting includes a third user, wherein the preference information comprises a commonality among the first user, the second user, and the third user.

8. The method of claim 1, wherein the preference information comprises a type of relationship between the first user and the second user.

9. An executable software product stored on a non-transitory computer-readable medium containing program instructions for enhancing user interaction over a network, the program instructions for:
receiving preference information from a first user, the preference information indicating at least one type of image the first user wishes to view; and in response to a network interaction being established between at least the first user and a second user, wherein the network interaction comprises an electronic meeting having a number of users that includes the first user and the second user,
retrieving a plurality of images associated with the second user based on the preference information, wherein the preference information comprises a user of the number of users that is talking at a given time in the electronic meeting; and
displaying the plurality of images based on the preference information.

10. The executable software product of claim 9 wherein the preference information comprises at least one of an image popularity preference, a user relationship preference, an interest preference, an activity preference, and an image attribute preference.

11. The executable software product of claim 9, wherein the retrieving comprises:
determining identification information associated with the second user; and
searching the network for the plurality of images based on the identification information and the preference information, wherein the searching comprises:
determining one or more sources for the plurality of images based on the identification information;
determining permission information for accessing each image of the plurality of images; determining the accessible images based on the permission information; and
matching the preference information with at least one tag associated with each accessible image.

12. The executable software product of claim 9 further comprising prioritizing the retrieved plurality of images based on preference information, wherein images having a higher priority are displayed more frequently than images having a lower priority.

13. The executable software product of claim 9, wherein the preference information comprises a location of a pointer of a mouse of the first user during the electronic meeting.

14. The executable software product of claim 9, wherein the user interaction over the network comprises an e-meeting that includes the first user and the second user, wherein the retrieving of the plurality of images comprises retrieving the plurality of images from multiple sources coupled to the network, wherein at least one source of the multiple sources comprises a social network server, wherein the retrieving comprises:
determining identification information associated with the second user; and
searching the network for the plurality of images based on the identification information and the preference information, wherein the searching comprises:
determining one or more sources from the multiple sources for the plurality of images based on the identification information;
determining permission information for accessing each image of the plurality of images;
determining the accessible images based on the permission information; and
matching the preference information with at least one tag associated with each accessible image.

15. The executable software product of claim 9, wherein the electronic meeting includes a third user, wherein the preference information comprises a commonality among the first user, the second user, and the third user.

16. The executable software product of claim 9, wherein the preference information comprises a type of relationship between the first user and the second user.

17. A system comprising:
a server coupled to a network; and
a client executed on a computer in communication with the server, wherein the client is configured to:
receive preference information from a first user, the preference information indicating at least one type of image the first user wishes to view; and
in response to a network interaction being established between at least the first user and a second user, wherein the network interaction comprises an electronic meeting having a number of users that includes the first user and the second user,
retrieve a plurality of images associated with the second user based on the preference information, wherein the preference information comprises a user of the number of users that is talking at a given time in the electronic meeting; and
display the plurality of images based on the preference information.

18. The system of claim 17 wherein the preference information comprises at least one of an image popularity preference, a user relationship preference, an interest preference, an activity preference, and an image attribute preference.

19. The system of claim 17, wherein the preference information comprises a location of a pointer of a mouse of the first user during the electronic meeting.

20. The system of claim 17, wherein the user interaction over the network comprises an e-meeting that includes the first user and the second user, wherein the retrieval of the plurality of images comprises the client configured to retrieve the plurality of images from multiple sources coupled to the network, wherein at least one source of the multiple sources comprises a social network server, wherein the retrieval comprises the client configured to:
determine identification information associated with the second user; and
search the network for the plurality of images based on the identification information and the preference information, wherein the search comprises the client configured to:
determine one or more sources from the multiple sources for the plurality of images based on the identification information;
determine permission information for accessing each image of the plurality of images;
determine the accessible images based on the permission information; and
match the preference information with at least one tag associated with each accessible image.

21. The system of claim 17, wherein the electronic meeting includes a third user, wherein the preference information comprises a commonality among the first user, the second user, and the third user.

22. The system of claim 17, wherein the preference information comprises a type of relationship between the first user and the second user.

* * * * *